United States Patent
Bissett et al.

(10) Patent No.: US 9,760,442 B2
(45) Date of Patent: Sep. 12, 2017

(54) METHOD OF DELAYING CHECKPOINTS BY INSPECTING NETWORK PACKETS

(71) Applicant: Stratus Technologies Bermuda Ltd., Hamilton (BM)

(72) Inventors: Thomas D. Bissett, Shirley, MA (US); Paul A. Leveille, Grafton, MA (US); Srinivasu Chinta, Nashua, NH (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 163 days.

(21) Appl. No.: 14/571,391

(22) Filed: Dec. 16, 2014

(65) Prior Publication Data

US 2015/0205672 A1 Jul. 23, 2015

Related U.S. Application Data

(60) Provisional application No. 61/921,720, filed on Dec. 30, 2013.

(51) Int. Cl.
| | | |
|---|---|---|
| *G06F 11/00* | (2006.01) | |
| *G06F 11/14* | (2006.01) | |
| *G06F 11/20* | (2006.01) | |

(52) U.S. Cl.
CPC ...... *G06F 11/1407* (2013.01); *G06F 11/1438* (2013.01); *G06F 11/1484* (2013.01); *G06F 11/2048* (2013.01); *G06F 11/2097* (2013.01)

(58) Field of Classification Search
CPC .......................... G06F 11/1407; G06F 11/1484
(Continued)

(56) References Cited

U.S. PATENT DOCUMENTS

| | | |
|---|---|---|
| 3,736,566 A | 5/1973 | Anderson et al. |
| 4,590,554 A | 5/1986 | Glazer et al. |

(Continued)

FOREIGN PATENT DOCUMENTS

| | | |
|---|---|---|
| EP | 0 750 261 A1 | 12/1996 |
| EP | 0 974 912 A2 | 1/2000 |

(Continued)

OTHER PUBLICATIONS

PCT International Search Report and the Written Opinion of the International Searching Authority for International Application No. PCT/US2014/070453, mailed Aug. 21, 2015, 24 pgs.

(Continued)

*Primary Examiner* — Elmira Mehrmanesh
(74) *Attorney, Agent, or Firm* — K&L Gates LLP

(57) ABSTRACT

A method of delaying checkpointing in a virtual machine system. In one embodiment, the method includes the steps of examining a network frame to determine if it is a deferrable frame and if the frame is a deferrable frame, delaying a checkpoint associated with the frame. In another embodiment, the deferrable frame is one of a group comprising: an IP packet tagged with the 'more fragments' attribute; TCP data segments that lack the PSH flag and carry no flags other than 'ACK'; and TCP segments that contain no data and carry only the 'ACK' flag; and any frame originating from or destined to a designated network address or port number. In still another embodiment, the method includes the step of concatenating the delays due to deferrable frames. In still yet another embodiment, the method further includes setting an upper limit to the amount of delay that can be generated.

19 Claims, 3 Drawing Sheets

(58) Field of Classification Search
USPC .......................................................... 714/18
See application file for complete search history.

(56) References Cited

U.S. PATENT DOCUMENTS

| | | |
|---|---|---|
| 4,751,702 A | 6/1988 | Beier et al. |
| 4,758,951 A | 7/1988 | Sznyter, III |
| 4,831,581 A | 5/1989 | Rubinfeld |
| 5,099,485 A | 3/1992 | Bruckert et al. |
| 5,155,809 A | 10/1992 | Baker et al. |
| 5,157,663 A | 10/1992 | Major et al. |
| 5,193,162 A | 3/1993 | Bordsen et al. |
| 5,235,700 A | 8/1993 | Alaiwan et al. |
| 5,333,265 A | 7/1994 | Orimo et al. |
| 5,357,612 A | 10/1994 | Alaiwan |
| 5,404,361 A | 4/1995 | Casorso et al. |
| 5,465,328 A | 11/1995 | Dievendorff et al. |
| 5,568,380 A | 10/1996 | Brodnax et al. |
| 5,615,403 A | 3/1997 | Bissett et al. |
| 5,621,885 A | 4/1997 | Del Vigna, Jr. |
| 5,694,541 A | 12/1997 | Service et al. |
| 5,721,918 A | 2/1998 | Nilsson et al. |
| 5,724,581 A | 3/1998 | Kozakura |
| 5,745,905 A | 4/1998 | Larsson et al. |
| 5,787,485 A | 7/1998 | Fitzgerald et al. |
| 5,790,397 A | 8/1998 | Bissett et al. |
| 5,802,265 A | 9/1998 | Bressoud et al. |
| 5,892,928 A | 4/1999 | Wallach et al. |
| 5,896,523 A | 4/1999 | Bissett et al. |
| 5,913,021 A | 6/1999 | Masubuchi |
| 5,918,229 A | 6/1999 | Davis et al. |
| 5,923,832 A | 7/1999 | Shirakihara et al. |
| 5,933,838 A | 8/1999 | Lomet |
| 5,948,112 A | 9/1999 | Shimada et al. |
| 5,958,070 A | 9/1999 | Stiffler |
| 5,968,185 A | 10/1999 | Bressoud et al. |
| 6,023,772 A | 2/2000 | Fleming |
| 6,035,415 A | 3/2000 | Fleming |
| 6,067,550 A | 5/2000 | Lomet |
| 6,088,773 A | 7/2000 | Kano et al. |
| 6,098,137 A | 8/2000 | Goodrum et al. |
| 6,105,148 A | 8/2000 | Chung et al. |
| 6,141,769 A | 10/2000 | Petivan et al. |
| 6,158,019 A | 12/2000 | Squibb |
| 6,289,474 B1 | 9/2001 | Beckerle |
| 6,301,677 B1 | 10/2001 | Squibb |
| 6,397,242 B1 | 5/2002 | Devine et al. |
| 6,401,216 B1 | 6/2002 | Meth et al. |
| 6,438,705 B1 | 8/2002 | Chao et al. |
| 6,453,343 B1 | 9/2002 | Housel, III et al. |
| 6,526,447 B1 | 2/2003 | Giammaria |
| 6,622,263 B1 | 9/2003 | Stiffler et al. |
| 6,678,369 B2* | 1/2004 | DeMent ............... H04Q 3/0025 379/221.03 |
| 6,687,849 B1 | 2/2004 | Cherf |
| 6,718,538 B1 | 4/2004 | Mathiske |
| 6,823,474 B2 | 11/2004 | Kampe et al. |
| 6,907,477 B2 | 6/2005 | Altman et al. |
| 6,954,877 B2 | 10/2005 | Earl et al. |
| 6,978,400 B2 | 12/2005 | Hickson et al. |
| 7,039,663 B1 | 5/2006 | Federwisch et al. |
| 7,055,063 B2 | 5/2006 | Leymann et al. |
| 7,058,846 B1 | 6/2006 | Kelkar et al. |
| 7,076,555 B1 | 7/2006 | Orman et al. |
| 7,080,375 B2 | 7/2006 | Martin |
| 7,162,698 B2 | 1/2007 | Huntington et al. |
| 7,206,964 B2 | 4/2007 | Moser et al. |
| 7,240,172 B2* | 7/2007 | Chong, Jr. .......... G06F 11/1466 707/999.1 |
| 7,249,118 B2 | 7/2007 | Sandler et al. |
| 7,289,433 B1 | 10/2007 | Chmara et al. |
| 7,299,337 B2 | 11/2007 | Traut et al. |
| 7,310,721 B2 | 12/2007 | Cohen |
| 7,363,538 B1 | 4/2008 | Kundu et al. |
| 7,380,039 B2 | 5/2008 | Miloushev et al. |
| 7,392,433 B2 | 6/2008 | Sahoo et al. |
| 7,545,752 B2 | 6/2009 | Krautkremer et al. |
| 7,577,934 B2 | 8/2009 | Anonsen et al. |
| 7,603,391 B1 | 10/2009 | Federwisch et al. |
| 7,743,381 B1 | 6/2010 | Tran |
| 7,934,035 B2 | 4/2011 | Miloushev et al. |
| 8,117,496 B2 | 2/2012 | Bashir et al. |
| 8,145,945 B2 | 3/2012 | Lee |
| 8,533,382 B2* | 9/2013 | Scales ................. G06F 11/1438 711/206 |
| 8,769,533 B2* | 7/2014 | North .................. G06F 11/1484 709/238 |
| 8,806,266 B1 | 8/2014 | Qu et al. |
| 8,812,907 B1 | 8/2014 | Bissett et al. |
| 9,323,553 B2* | 4/2016 | Larson ............... G06F 9/45533 |
| 9,459,895 B2 | 10/2016 | Venkitachalam et al. |
| 2002/0073249 A1 | 6/2002 | French et al. |
| 2002/0073276 A1 | 6/2002 | Howard et al. |
| 2002/0078308 A1 | 6/2002 | Altman et al. |
| 2002/0147890 A1 | 10/2002 | Saulsbury et al. |
| 2003/0005102 A1 | 1/2003 | Russell |
| 2003/0005356 A1 | 1/2003 | Franckowiak et al. |
| 2003/0084376 A1 | 5/2003 | Nash et al. |
| 2003/0163763 A1 | 8/2003 | DeLano |
| 2004/0001435 A1 | 1/2004 | Wong |
| 2004/0010663 A1 | 1/2004 | Prabhu |
| 2004/0143776 A1 | 7/2004 | Cox |
| 2004/0158549 A1 | 8/2004 | Matena et al. |
| 2004/0193658 A1 | 9/2004 | Kawamura et al. |
| 2004/0193945 A1 | 9/2004 | Eguchi et al. |
| 2004/0199812 A1 | 10/2004 | Earl et al. |
| 2004/0267897 A1 | 12/2004 | Hill et al. |
| 2005/0015702 A1 | 1/2005 | Shier et al. |
| 2005/0201373 A1 | 9/2005 | Shimazu et al. |
| 2005/0229039 A1 | 10/2005 | Anderson et al. |
| 2005/0251785 A1 | 11/2005 | Vertes et al. |
| 2005/0256826 A1 | 11/2005 | Hambrick et al. |
| 2006/0047925 A1 | 3/2006 | Perry |
| 2006/0062142 A1 | 3/2006 | Appanna et al. |
| 2006/0112297 A1 | 5/2006 | Davidson |
| 2006/0179147 A1 | 8/2006 | Tran et al. |
| 2007/0027985 A1 | 2/2007 | Ramany et al. |
| 2007/0174484 A1 | 7/2007 | Lussier et al. |
| 2009/0113109 A1 | 4/2009 | Nelson et al. |
| 2009/0193298 A1 | 7/2009 | Mukherjee |
| 2010/0077164 A1 | 3/2010 | Stiffler et al. |
| 2010/0095074 A1 | 4/2010 | Ganesh et al. |
| 2010/0107158 A1 | 4/2010 | Chen et al. |
| 2010/0235591 A1* | 9/2010 | Akutsu ............... G06F 11/2058 711/154 |
| 2010/0325500 A1 | 12/2010 | Bashir et al. |
| 2011/0161639 A1 | 6/2011 | Knauth et al. |
| 2011/0167194 A1 | 7/2011 | Scales et al. |
| 2011/0167195 A1 | 7/2011 | Scales et al. |
| 2011/0167196 A1 | 7/2011 | Scales et al. |
| 2011/0167298 A1 | 7/2011 | Lee |
| 2011/0258625 A1* | 10/2011 | Waldspurger ....... G06F 11/1438 718/1 |
| 2011/0289345 A1 | 11/2011 | Agesen et al. |
| 2011/0289417 A1 | 11/2011 | Schaefer et al. |
| 2012/0011401 A1 | 1/2012 | Ranganathan et al. |
| 2012/0011508 A1 | 1/2012 | Ahmad |
| 2012/0084520 A1 | 4/2012 | Chou et al. |
| 2012/0266018 A1 | 10/2012 | Tanaka |
| 2012/0284721 A1 | 11/2012 | Antani et al. |
| 2013/0024855 A1 | 1/2013 | North |
| 2013/0198139 A1* | 8/2013 | Skidanov .......... G06F 17/30289 707/649 |
| 2013/0212205 A1 | 8/2013 | Flockhart et al. |
| 2013/0311992 A1 | 11/2013 | Fuente et al. |
| 2014/0040206 A1 | 2/2014 | Ramakrishnan et al. |
| 2014/0201574 A1 | 7/2014 | Manchek et al. |
| 2014/0215461 A1* | 7/2014 | Laor ................... G06F 9/45533 718/1 |
| 2015/0007172 A1 | 1/2015 | Hudzia et al. |
| 2015/0009804 A1 | 1/2015 | Koponen et al. |
| 2015/0082087 A1 | 3/2015 | Jacobs et al. |
| 2015/0095907 A1 | 4/2015 | Jacobs et al. |
| 2015/0127809 A1 | 5/2015 | Akella et al. |

(56) References Cited

U.S. PATENT DOCUMENTS

| | | | |
|---|---|---|---|
| 2015/0149999 A1 | 5/2015 | Ramanathan et al. |
| 2015/0180761 A1 | 6/2015 | Watanabe |
| 2015/0205672 A1 | 7/2015 | Bissett et al. |

FOREIGN PATENT DOCUMENTS

| | | | |
|---|---|---|---|
| GB | 2 268 817 A | 1/1994 |
| JP | 10-320326 A | 12/1998 |
| JP | 2004-206212 A | 7/2004 |
| WO | 92/17842 A1 | 10/1992 |
| WO | 99/26133 A2 | 5/1999 |

OTHER PUBLICATIONS

International Search Report and the Written Opinion of the International Searching Authority for International Application No. PCT/US2014/070456, mailed Jun. 22, 2015, 16 pages.
International Preliminary Report on Patentability from PCT/US2014/070461 dated Jul. 5, 2016.
International Preliminary Report on Patentability from PCT/US2014/070453 dated Jul. 5, 2016.
International Preliminary Report on Patentability from PCT/US2014/070456 dated Jul. 5, 2016.
Clark et al., "Live Migration of Virtual Machines," NSDI '05 $2^{nd}$ Symposium on Networked Systems Design & Implementation, USENIX Association, May 4, 2005, pp. 273-286.
Cully et al., "Remus: High Availability via Asynchronous Virtual Machine Replication," The University of British Columbia, Department of Computer Science, 14 pages.
Kim et al., "Process Allocation for Load Distribution in Fault-Tolerant Multicomputers," IEEE Publication, pp. 174-183, 1995.
Nakamikawa et al., "High Performance Fault Tolerant Computer and its Fault Recovery," 1997 IEEE, pp. 2-6.
Tamura, "Modernization of Kemari using HVM with PV Drivers," Nippon Telegraph and Telephone Corporation, NTT Cyber Space Labs, Nov. 20, 2008, 23 pages.
Tamura et al., "Kemari: Virtual Machine Synchronization for Fault Tolerance," NTT Cyber Space Labs, 2 pages.
Tamura, "Kemari: Virtual Machine Synchronization for Fault Tolerance using DomT," Nippon Telegraph and Telephone Corporation, NTT Cyber Space Labs, Jun. 24, 2008, 19 pages.
Tamura et al., "Virtual Machine Synchronization for High Availability Clusters," Nippon Telegraph and Telephone Corporation, NTT Cyber Space Labs, Apr. 17, 2007, 17 pages.
PCT International Search Report for International Application No. PCT/US06/19754, dated Oct. 17, 2007, 3 pages.
Supplementary European Search Report for Application No. EP 06770856, completed Nov. 10, 2010, 6 pages.
PCT International Search Report and PCT Written Opinion of the International Searching Authority for International Application No. PCT/US2014/070461, mailed Apr. 2, 2015, 9 pages.

\* cited by examiner

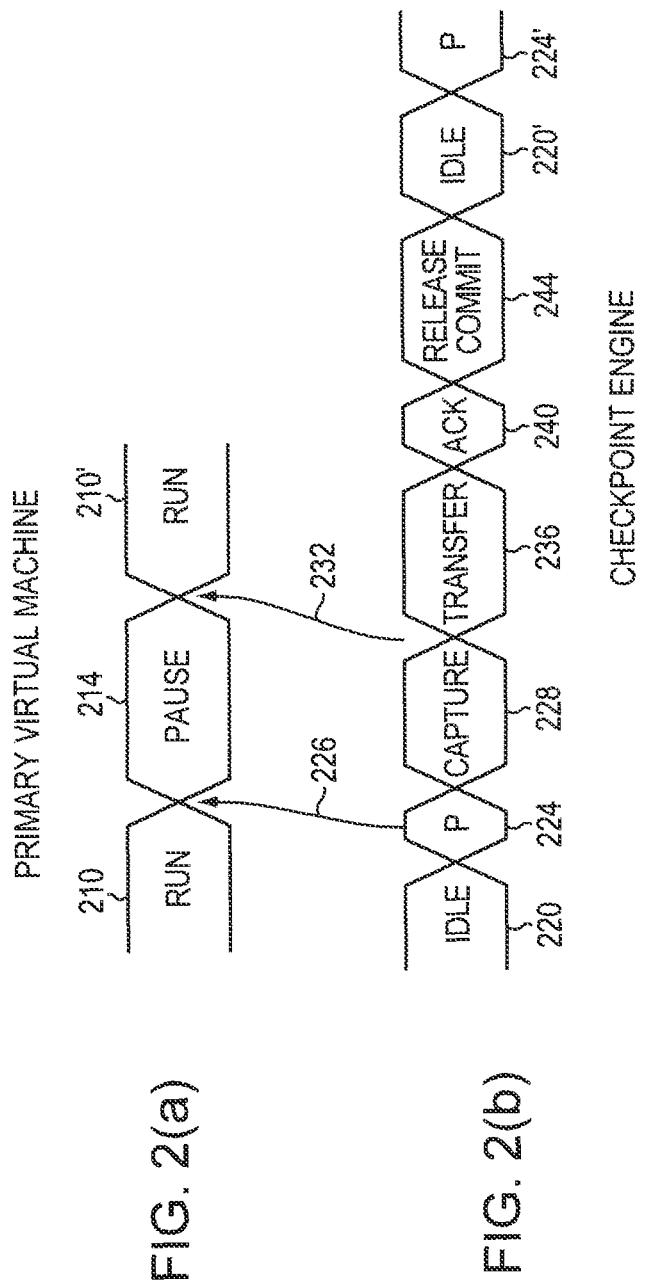

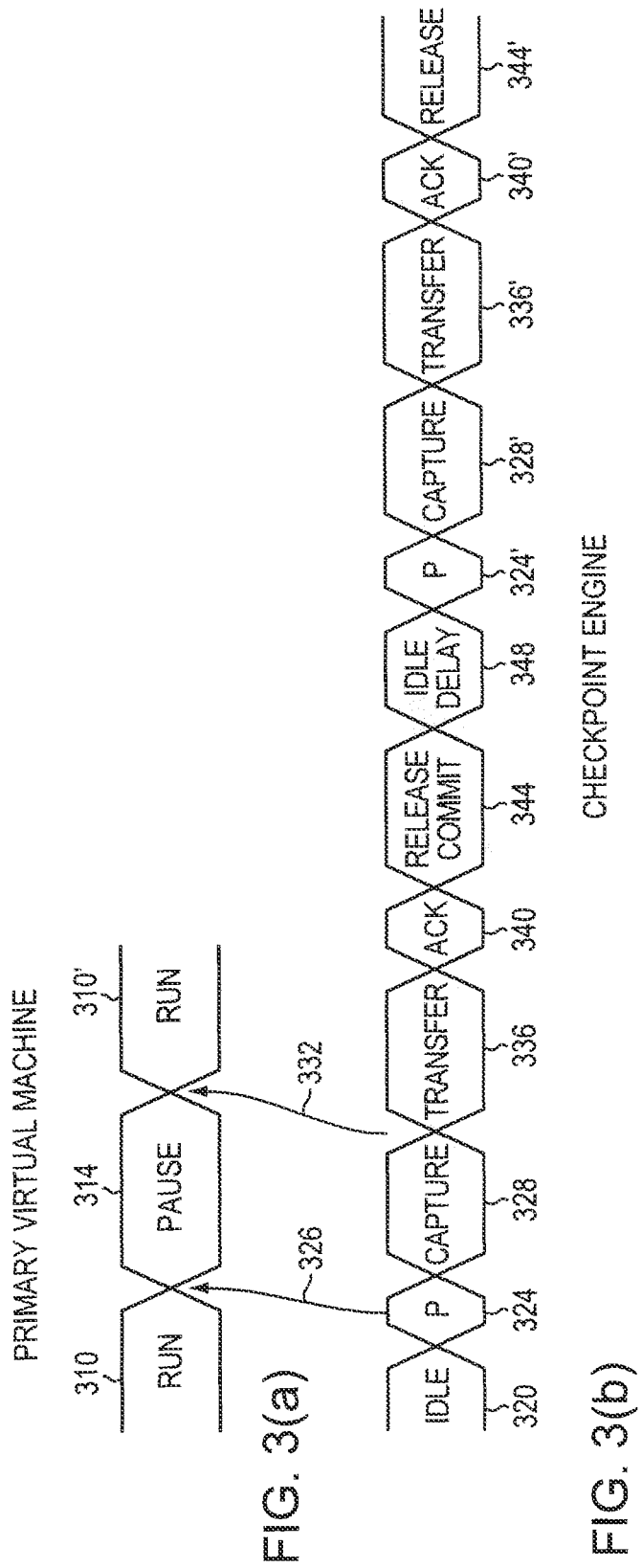

METHOD OF DELAYING CHECKPOINTS BY INSPECTING NETWORK PACKETS

RELATED APPLICATIONS

This application claims priority to U.S. provisional patent application 61/921,720 filed on Dec. 30, 2013 and owned by the assignee of the current application, the contents of which are herein incorporated by reference in their entirety.

FIELD OF THE INVENTION

The invention relates generally to the field of fault tolerant computing and more specifically to checkpointing, networking and virtualization systems.

BACKGROUND OF THE INVENTION

There are a variety of ways to achieve fault tolerant computing. Specifically, fault tolerant hardware and fault tolerant software may be used either alone or together. As an example, it is possible to connect two (or more) computers, such that one computer, the active computer or host, actively makes calculations while the other computer (or computers) is idle or on standby in case the active computer, or hardware or software component thereon, experiences some type of failure. In these systems, the information about the state of the active computer must be saved periodically to the standby computer so that the standby computer can substantially take over from the previously active computer at the point in the calculations where active computer experienced a failure. This function can be extended for use with the modern day practice of using a virtualized environment as part of a cloud or other computing system.

Virtualization is used in many fields to reduce the number of servers or other resources needed for a particular project or organization. Present day virtual machine computer systems utilize virtual machines (VM) operating as guests within a physical host computer. Each virtual machine includes its own virtual operating system and operates under the control of a managing operating system or hypervisor executing on the host physical machine. Each virtual machine executes one or more applications and accesses physical data storage and computer networks as required by the applications. In addition, each virtual machine may in turn act as the host computer system for another virtual machine.

Multiple virtual machines may be configured as a group to execute one or more of the same programs. Typically, one virtual machine in the group is the primary or active virtual machine, and the remaining virtual machines are the secondary or standby virtual machines. If something goes wrong with the primary virtual machine, one of the secondary virtual machines can take over and assume its role in the fault tolerant computing system. This redundancy allows the group of virtual machines to operate as a fault tolerant computing system. The primary virtual machine executes applications, receives and sends network data, and reads and writes to data storage while performing automated or user-initiated tasks or interactions. The secondary virtual machines have the same capabilities as the primary virtual machine, but do not take over the relevant tasks and activities until the primary virtual machine fails or is affected by an error.

For such a collection of virtual machines to function as a fault tolerant system, the operating state, which defines memory and data storage contents of a secondary virtual machine, should be equivalent to the operating state that is memory and data storage contents of the primary virtual machine. If this condition is met, the secondary virtual machine may take over for the primary virtual machine without a loss of any data. To assure that the state of the secondary machine and its memory is equivalent to the state of the primary machine and its memory, it is necessary for the primary virtual machine periodically to transfer its state and memory contents to the secondary virtual machine.

The periodic transfer of data to maintain synchrony between the states of the virtual machines is termed checkpointing. A checkpoint defines a point in time when the data is to be transferred. During a checkpoint, the processing on the primary virtual machine is paused, so that the final state of the virtual machine and associated memory is not changed during the checkpoint interval and once the relevant data is transferred, both the primary and secondary virtual machines are in the same state. The primary virtual machine is then resumed and continues to run the application until the next checkpoint, when the process repeats.

Checkpoints can be determined by either the passage of a fixed amount of elapsed time from the last checkpoint or by the occurrence of some event, such as: the number of memory accesses (termed dirty pages); the occurrence of a network event (such as network acknowledgement that is output from the primary virtual machine); or the occurrence of excessive buffering on the secondary virtual machine (as compared to available memory), during the execution of the application. Elapsed time checkpointing is considered fixed checkpointing, while event based checkpointing is considered dynamic or variable-rate checkpointing.

Excessive checkpointing can lead to performance degradation of the primary virtual machine. In turn, this performance degradation can result in delays and data loss, which can compromise the fault tolerant nature of the system. Triggering checkpoints in response to network traffic can be particularly taxing for a checkpointing system.

Therefore, a need exists for ways to reduce overhead in the system without reducing the reliability of the system.

Embodiments of the invention address this need and others.

SUMMARY OF THE INVENTION

In one aspect, the invention relates to a method for delaying checkpointing in a virtual machine system. In one embodiment, the method includes the steps of determining if a frame is deferrable; and if the frame is a deferrable frame delaying a checkpoint associated with the frame. In another embodiment the frame is examined to determine if it is a deferrable frame. In yet another embodiment the deferrable frame is a packet tagged with one or more of: not being the last data fragment of a multi-fragment message; a data segment that does not indicate a flush of the send buffer; and a segment that only serves as an acknowledge of some prior message. In still another embodiment the deferrable frame is an IP packet tagged with one or more of: a 'more fragments' attribute; a TCP data segment that lacks the PSH flag and that carries no flags other than 'ACK'; and a TCP segment that contains no data and carries only the 'ACK' flag. In still yet another embodiment the deferrable frame is identified by the protocol in use.

In one embodiment, the deferrable frame is identified by the session-state of the protocol in use. In another embodiment, the deferrable frame is identified by port number. In yet another embodiment, the port number is a source port number. In still another embodiment, the port number is a destination port number. In still yet another embodiment, the deferrable frame is identified by network address. In one embodiment, the network address is a source network address. In another embodiment, the network address is a destination network address.

In one embodiment, the method includes the step of concatenating the checkpoint delays due to a plurality of deferrable frames. In another embodiment, the method includes the step of setting an upper limit to the amount of delay that can be generated. In yet another embodiment, the frame is determined to be deferrable based on the network interface in use.

In another aspect, the invention relates to a fault tolerant computing system. In one embodiment, the fault tolerant computer system includes a first computing device comprising a primary virtual machine; and a second computing device comprising a secondary virtual machine, wherein the first computing device and the second computing device are networked, wherein the primary virtual machine comprises a first checkpointing engine and a first network interface, wherein the secondary virtual machine comprises a second checkpointing engine and a second network interface, and wherein the first checkpointing engine delays a checkpoint for one or more deferrable frames of data. In another embodiment, the first checkpoint engine pauses the primary virtual machine when a checkpoint is declared. In yet another embodiment, the first checkpoint engine adds an additional delay before declaring a subsequent checkpoint. In still yet another embodiment, the first checkpoint engine captures the state of the primary virtual machine while the primary virtual machine is paused.

BRIEF DESCRIPTION OF THE DRAWINGS

The structure and function of the invention can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

FIGS. 2 (a) and (b) are timing diagrams known to the prior art for an embodiment of a virtual machine and a checkpointing engine, respectively.

FIGS. 3 (a) and (b) are timing diagrams for an embodiment of a virtual machine and a checkpointing engine, respectively, constructed in accordance with the invention.

DESCRIPTION OF A PREFERRED EMBODIMENT

Figure 1:
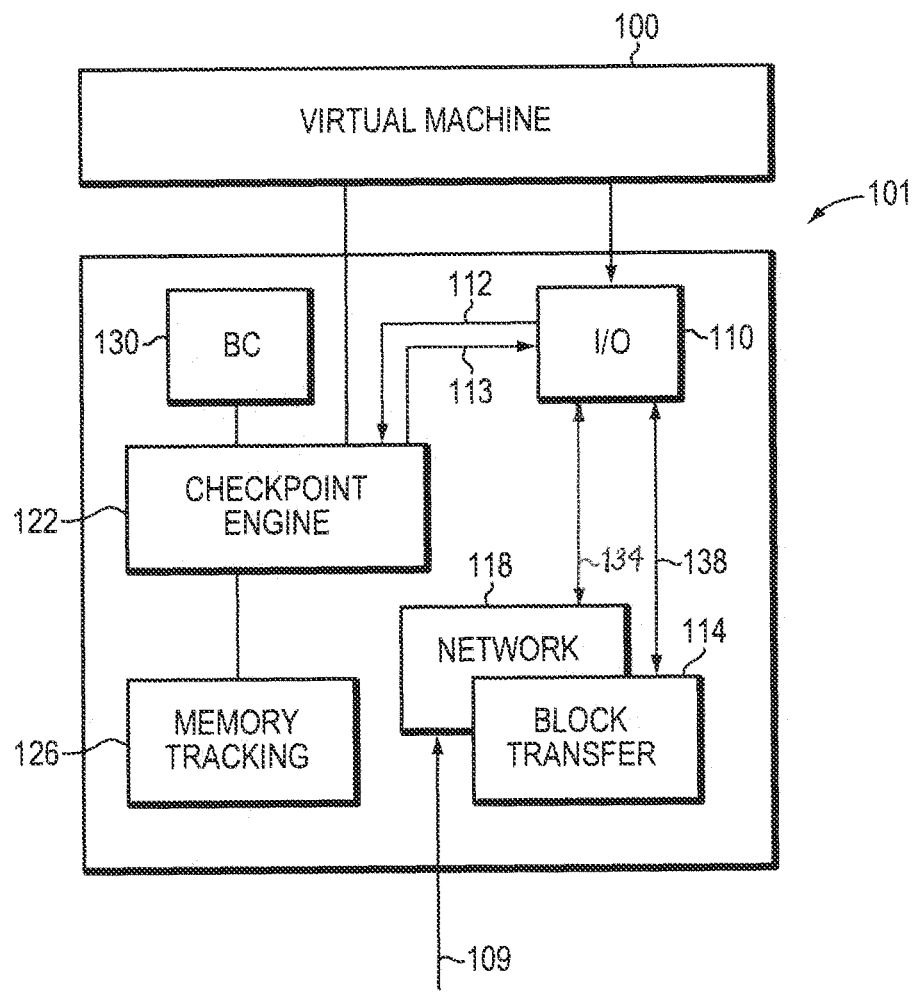
FIG. 1 is a block diagram of an embodiment of a checkpointing engine in a virtual machine constructed in accordance with the invention.

Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the art to variously employ the invention in virtually any appropriately detailed embodiment.

In a variable-rate checkpoint system, an excessive checkpoint rate can occur when checkpoint cycles are initiated on the primary virtual machine in response to the occurrence of an event on the primary virtual machine such as outbound network data transmission or traffic. Normally, such outbound network traffic causes an immediate checkpoint cycle to ensure the occurrence of lower-latency exchanges between the primary virtual machine and the computer on the network receiving the transmission from the virtual machine. This is indeed the case for file-level operations such as folder enumeration, file deletion, attribute manipulation, and even single-threaded transaction exchanges.

Under these types of latency-sensitive exchanges, it is desirable to have a rapid and responsive checkpoint rate. Latency-sensitive exchanges such as certain client requests and server responses benefit from a very responsive checkpoint mechanism. However, other exchanges, such as certain communication protocol flags and parameters, between a client and server are "housekeeping" in nature. Communications of this housekeeping or procedural-type activity produce outbound traffic from the primary virtual machine that results in excessive checkpoint activity. This excessive checkpoint activity is detrimental to application efficiency and requires substantial processing and inter-host communication overhead to handle.

An example of a network exchange of data that is housekeeping in nature is a simple TCP acknowledge packet or 'ACK'. When a client is transferring a file to the guest virtual machine using TCP protocol, the guest virtual machine's TCP stack typically responds to each message/segment with an 'ACK'. Hundreds of such rapid 'ACKs' can be generated as this incoming stream of segments is underway. The computer receiving the ACK is not dependent on the ACK in order to continue to operate or handle other necessary processing tasks. Further, with few exceptions, it is not necessary that the client computer receive these 'ACKs' in real time. Performing an immediate checkpoint cycle for each such 'ACK' would interfere greatly with the incoming message/segment flow of client frames while providing little or no benefit.

Another example of such a housekeeping network exchange of data is an IP packet tagged with the IP_MF flag, indicating that more data packet fragments are coming. These types of outbound frames increase the checkpoint rate and associated system overhead, thereby resulting in lower overall system efficiency. As a result, the checkpoints that arise from these types of network data exchanges are not critical and can be deferred for processing at a later time.

According to one embodiment, outbound network traffic and operational parameters can be monitored to detect data such as frames that can be categorized as deferrable. By deferrable, it is meant that the computer receiving the data, such as an ACK, is not typically waiting for the specific frame in order to continue processing or otherwise operating. Deferrable data examples include: IP packets tagged with the 'more fragments' attribute; TCP data segments that lack the PSH flag (push) and carry no flags other than 'ACK'; and TCP segments that contain no data and only the 'ACK' flag. Other candidate frames and data types may exist and are handled similarly.

The above embodiments describe TCP/IP specific packets and field definitions that can be generalized to almost any network protocol. Housekeeping only packets such as IP specific "ACK" are candidates for deferrable packets. Fragmented packets such as those identified in IP with IP_MF are candidates for deferrable packets. Likewise, packets that contain no data and are not part of a send buffer flush (as in the TCP PSH flag), are also candidates for deferrable packets. Many other packet types and conditions can be identified depending on the specific protocol being used. There are hundreds of registered network protocols, each of which has its own behavior characteristics. Every packet in a given protocol may be deferrable.

Referring to FIG. 1, components of a checkpointing engine 122 with a virtual machine 100 are shown. The virtual machine 100 would typically be connected to a second virtual machine (not shown) to achieve a fault tolerant computing system. The virtual machine 100 includes a checkpoint module 101. The checkpoint module 101 buffers network data 109 in an input/output module (I/O) 110 and a notification event 112 alerts the checkpointing engine 122. Storage data (referred to generically as block—IO) is allowed to move 138 more freely between input/output module (I/O) 110 and the block interface 114. The checkpointing engine 122 is in communication with a memory tracking module 126 and a buffer cache 130. When the checkpointing engine 122 is idle, network data (if any) remains in a buffered state by input/output module (I/O) 110, and will only be released by signal 113 to input/output module (I/O) 110 after the next checkpoint reaches its commit/release stage. At that time, network data (if any) is transferred 134 from the input/output module (I/O) 110 to the network interface 118. When a checkpoint is declared, the virtual machine 100 is paused and the dirty page data is processed by the checkpointing engine 122. In the case of the present invention, when a checkpoint is declared, for example by an ACK frame being received by the I/O module 110, the frame is made available to the checkpoint engine 122 for inspection.

In more detail and referring to FIG. 2(a), a timing diagram of events and methods occurring in sequence for a primary virtual machine is shown for a checkpoint system known to the prior art. The primary virtual machine is either running (executing the application) 210, 210' or paused 214. The checkpointing engine includes additional timing conditions as shown in FIG. 2(b). The checkpointing engine may be idle 220 until a checkpoint (P) occurs 224 at which time the checkpointing engine causes 226 the primary virtual machine to pause 214. While the primary virtual machine is paused 214, the state of the primary virtual machine is captured 228 by the checkpoint engine. Capture is a page-copying stage that allows the virtual machine to be resumed and executed in parallel with checkpoint 'transfer' and 'ACK-wait'.

In another embodiment, page-copying is avoided all together and pages are just transferred as they are. In this case, the guest remains paused during the transfer and ACK-wait stages. Combinations of these two approaches may also be used. Once the state data is captured 228, the checkpointing engine resumes 232 the primary virtual machine which again executes 210' the application.

The captured state data is then transferred 236 to the secondary virtual machine. Once the data has been transferred, the checkpointing engine waits for an acknowledgement (ACK) to be received 240 from the secondary virtual machine, indicating that the data has been received. At this point, the checkpoint cycle is committed and the buffered network data released 244 to the network. At this point the checkpointing engine enters an idle state 220' until the next checkpoint 224' occurs.

When certain triggering events occur, which are not deferrable, a checkpoint is declared. Some non-limiting examples of checkpoint triggering events are as follows: a timer initiating a checkpoint period, a network event such as an ACK reply being required from the primary virtual machine to another computer on the network, and a write operation to a memory page occurring. Even though a checkpoint is declared, until the virtual machine is paused by the checkpointing engine, additional checkpoint generating events may occur. Thus, many checkpoints may be queued with each requiring action by the checkpointing engine. For example, each subsequent checkpoint will, at a minimum, require a pausing and restarting of the virtual machine, contributing to the time overhead of the system in which the primary virtual machine is not doing useful work.

When a deferrable frame or other deferrable data such as an ACK is detected, the system causes a checkpoint to be time-scheduled at some near point in the future, rather than being generated immediately. In some embodiments, subsequent deferrable frames can modify the timer, as appropriate, to extend, shorten, or cancel the delay to the scheduled checkpoint cycle. The delay timer is automatically cancelled when non-deferrable data is detected, or another triggering event for a checkpoint occurs (which overrides the delay of a checkpoint), thereby reverting to normal checkpoint initiation policy at that instant.

The amount of deferrable frame delay can be fixed or calculated based on other inputs, but should be sufficiently large to allow the system to aggregate other deferrable data frames likely to appear within the delay. However, the delay should also be sufficiently short to avoid problems in the event that a frame deemed as deferrable is, for some reason, time-sensitive to the receiving computer. In one embodiment, a delay of from about 5 to about 10 milliseconds is suitable.

Referring to FIG. 3(a), the timing of the virtual machine is shown for a checkpoint system according to the present invention. In this embodiment, the primary virtual machine is either running (executing one or more applications) 310, 310' or paused 314. The checkpointing engine operates under the timing conditions as shown in FIG. 3(b). A number of checkpointing engine timing transitions are the same as shown in FIG. 2(b). For example, the checkpointing engine may be idle 320 until a checkpoint (P) occurs 324, at which time the checkpointing engine causes 326 the primary virtual machine to pause 314. While the primary virtual machine is paused 314, the state of the primary virtual machine is captured 328 by the checkpoint engine. Once the state data is captured 328, the checkpointing engine resumes 332 the primary virtual machine which again executes 310' one or more applications.

The captured state data is then transferred 336 to the secondary virtual machine. Once the data has been transferred, the checkpointing engine waits for an acknowledgement (ACK) 340 to be received from the secondary virtual machine, indicating that the data has been received. At this point, the checkpoint data is committed 344, for example by releasing one or more frames of data to the network.

The checkpointing engine then enters an idle state 348 but in this embodiment, the idle state includes an additional delay period if the events generating a subsequent checkpoint are deferrable. If the events are deferrable, a delay is added to the idle period before the next checkpoint 324' is declared. This increased delay permits additional checkpoint events to be queued prior to a checkpoint being declared, thus allowing multiple checkpoint events to be covered by one set of checkpoint operations. This reduces the overhead per event for handling a checkpoint.

The method for determining the existence of a deferrable frame should be applied easily and quickly, without the need to track the history of a connection/session. In this sense, the test for a deferrable frame is stateless with regard to the ongoing dialogue between the virtual machine and the other computer on the network. Some exemplary characteristics of implementing a checkpoint delay and deferrable data-based method are: acting on the most commonly used transport protocols (but the method can also be adapted to custom protocols); not causing frames to be dropped or re-ordered as a means of improving checkpoint performance; and controlling selectivity by applying different rules to various deferrable frame types.

Additionally, the checkpoint delay can be applied not only according to whether the frame itself is deferrable, but also whether the frame is directed to or originating from specific network (MAC, IP, etc.) addresses and/or port numbers, some of which are typically used by convention for certain applications. Thus, the system can be set to defer any packet (or prevent the deferral and checkpoint delay of any packet) originating from/destined to a specific network address and/or port number (e.g. port 89) based on convention or rules provided to the checkpointing engine. Various special handling of data which is important to a networked computer can be used to override deferrable checkpoints and checkpoint delays or to more aggressively cause delays for selected network addresses and/or ports.

In another embodiment, the virtual machine has multiple network interfaces. The network traffic on a specific network interface may be of a nature such that all of its packets are deferrable. It is also possible that a specific network interface only carries non-deferrable packets.

An example of special case handling in the checkpoint context is TCP ACKs known as 'window updates'. These ACKs provide specific information about the sender's TCP send window, and delaying these may occasionally cause the sender (the client) to pause its transmission. Accurately detecting when 'window update' information is important to the sender is difficult and adds little improvement to the general approach of deferrable frame management, especially when the send window size reaches a full 64 KB (typical) or larger (window scaling) size.

However, such send-window stalls may still occur, which is an important reason for keeping the deferrable delay from getting too large. Thus, it is important to limit the amount of delay that can be generated so as not to allow the delay to affect other functions of the virtual machine. It is also acceptable for partial or full session-state tracking to be used to selectively avoid delaying a "window update" packet Unless specifically stated otherwise as apparent from the following discussion, it is appreciated that throughout the description, discussions utilizing terms such as "processing" or "computing" or "calculating" or "delaying" or "comparing", "generating" or "determining" or "deferring" or "committing" or "checkpointing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will be understood from the description above. In addition, the present invention is not described with reference to any particular programming language, and various embodiments may thus be implemented using a variety of programming languages.

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

It should be understood that the order of steps or order for performing certain actions is immaterial so long as the present teachings remain operable. Moreover, two or more steps or actions may be conducted simultaneously.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are intended to be embraced therein.

What is claimed is:

1. A method of delaying an initiation of a checkpoint in a virtual machine system comprising the steps of:
    establishing an input/output module;
    buffering a deferrable or non-deferrable frame in the input/output module;
    determining whether the frame is a deferrable frame or a non-deferrable frame;
    if the frame is a deferrable frame, delaying an initiation of a checkpoint; and
    not transmitting the frame until the checkpoint occurs.

2. The method of claim 1 wherein the frame is examined to determine if it is a deferrable frame.

3. The method of claim 2 wherein the deferrable frame is a packet tagged with one or more of:

not being a last data fragment of a multi-fragment message;
a data segment that does not indicate a flush of a send buffer; and
a segment that only serves as an acknowledgment of some prior message.

4. The method of claim 2 wherein the deferrable frame is an internet protocol (IP) packet tagged with one or more of:
a 'more fragments' attribute;
a transmission control protocol (TCP) data segment that lacks a push (PSH) flag and that carries no flags other than an acknowledgement (ACK); and
a transmission control protocol (TCP) segment that contains no data and carries only the acknowledgement (ACK) flag.

5. The method of claim 2 wherein the deferrable frame is identified by a protocol in use.

6. The method of claim 5 wherein the deferrable frame is identified by a session-state of the protocol in use.

7. The method of claim 2 wherein the deferrable frame is identified by port number.

8. The method of claim 7 wherein the port number is a source port number.

9. The method of claim 7 wherein the port number is a destination port number.

10. The method of claim 2 wherein the deferrable frame is identified by network address.

11. The method of claim 10 wherein the network address is a source network address.

12. The method of claim 10 wherein the network address is a destination network address.

13. The method of claim 1 further comprising the step of concatenating the checkpoint delays due to a plurality of deferrable frames.

14. The method of claim 13 further comprising the step of setting an upper limit to the amount of delay that can be generated.

15. The method of claim 1 wherein the frame is determined to be deferrable based on a network interface in use.

16. A fault tolerant computing system comprising:
a first computing device comprising a primary virtual machine; and
a second computing device comprising a secondary virtual machine,
wherein the first computing device and the second computing device are networked,
wherein the primary virtual machine comprises a first checkpointing engine and a first network interface having a first input/output module for buffering frames,
wherein the secondary virtual machine comprises a second checkpointing engine and a second network interface,
wherein the primary virtual machine buffers a frame in the first input/output module,
wherein the primary virtual machine determines whether the frame is a deferrable frame or a non-deferrable frame,
wherein the first checkpointing engine delays an initiation of a checkpoint for each of the one or more deferrable frames of data in the first input/output module, and
wherein the deferrable and non-deferrable frames in the first input/output module are not transmitted until the checkpoint occurs.

17. The fault tolerant computing system of claim 16 wherein the first checkpoint engine pauses the primary virtual machine when a checkpoint is declared.

18. The fault tolerant computing system of claim 17 wherein the first checkpoint engine adds an additional delay before declaring a subsequent checkpoint.

19. The fault tolerant computing system 16 wherein the first checkpoint engine captures the state of the primary virtual machine while the primary virtual machine is paused.

* * * * *